Patented Sept. 19, 1933

1,927,114

UNITED STATES PATENT OFFICE 1,927,114

HALOGENATION PRODUCT OF ACENAPH-THINDANDION - DIKETIMIDES AND A PROCESS OF PREPARING IT

Wilhelm Eckert and Heinrich Sieber, Frankfort-on-the-Main-Hoechst, Germany, assignors to General Aniline Works, Inc., New York, N. Y., a corporation of Delaware No Drawing. Application October 6, 1932, Serial No. 636,586, and in Germany October 10, 1931

8 Claims. (Cl. 260—127)

The present invention relates to new valuable halogenation products of acenaphthindandion-diketimides and to a process of preparing them.

We have found that new valuable halogenation products of acenaphthindandion-diketimides of the probable general formula:

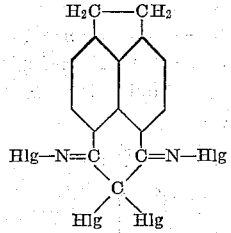

are obtained by a process which comprises causing a halogenating agent to act upon an acenaphthindandion-diketimide of the probable general formula:

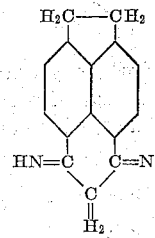

Instead of the acenaphthindandion-diketimides used as starting material, the salts thereof may be used with the same effect. They are to be considered as equivalent starting materials for the purpose of the present invention.

It has been found to be advantageous to effect the halogenation at an elevated temperature, for instance, of about 30° C. to about 60° C. in a neutral or acid medium, i. e. in a neutral or acid solution or suspension.

As halogenating agents there may be used, for instance, sulfuryl chloride, free gaseous chlorine, bromine, a mixture of potassium chlorate with hydrochloric acid, or the like.

The new products are very reactive; under certain conditions, for instance, when warmed in the presence of a dilute acid, they may be transformed into dihalogen-acenaphth-peri-indandions of the following constitution:

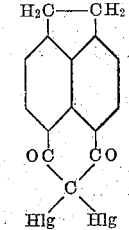

By heating the latter compounds with alkalies they dissolve probably with formation of 5-dihalogenacetyl-acenaphthene-6-carboxylic acids of the following constitution:

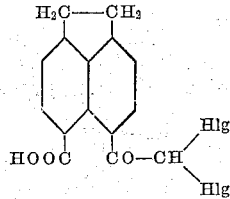

By introducing them into dilute alkaline hypochlorite solution there is obtained with a quantitative yield acenaphthalic acid which, by further oxidation, quantitatively yields 1.4.5.8-naphthalene-tetra-carboxylic acid. The new derivatives are valuable intermediate products for the manufacture of dyestuffs.

The following examples serve to illustrate the invention, but they are not intended to limit it thereto, the parts being by weight, unless stated otherwise:

(1) 90 parts of acenaphth-peri-indandion-diketimide or the corresponding quantity of a salt thereof—obtainable according to the process described in U. S. patent application Serial No. 486,859 filed on October 6, 1930, in the name of Heinrich Greune and Wilhelm Eckert—are finely dispersed in a mixture of 300 parts of water and 150 parts by volume of crude concentrated hydrochloric acid. At a temperature of 50° C.-60° C., about 38 parts of potassium chlorate are gradually introduced and the whole is heated at this temperature for some time. By addition of certain salts as, for instance, magnesium chloride, the reaction is accelerated. The reaction is finished as soon as in a test portion unchanged diketimide can no longer be detected. The halogenation product thus formed is filtered by suction, washed until neutral and dried; the yield is quantitative.

The new compound melts at about 193° C. with decomposition and dissolves in concentrated sulfuric acid to a yellow-orange solution showing no fluorescence.

(2) 20 parts of acenaphthindandion-diketimide are dispersed as finely as possible in 600 parts of water, whereby part of the compound dissolves. Into the solution gaseous chlorine is introduced at about 40° C., until the color becomes considerably lighter and the starting materal can no longer be detected in a test portion taken from the solution. The chlorination product thus formed is filtered by suction, washed and dried. It forms a yellowish-white product. It deflagrates on heating and splits off free chlorine on being warmed with dilute acids. The new compound has the following probable constitution:

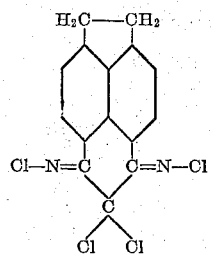

(3) To a suspension of 20 parts of acenaphthindandion-diketimide in 600 parts of water 44 parts of bromine are gradually added at 40° C. The mass is then heated until unchanged diketimide can no longer be detected, filtered by suction, the solid product is washed and dried. The compound behaves in a manner similar to that of the product described in Example 2.

We claim:

1. The process which comprises causing a halogenating agent to act upon an acenaphthindandion-diketimide of the probable general formula:

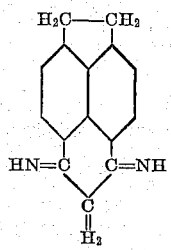

2. The process which comprises causing a halogenating agent to act in an acid medium upon an acenaphthindandion-diketimide of the probable general formula:

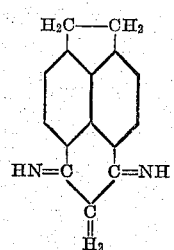

3. The process which comprises causing potassium chlorate to act at a temperature of about 50° C. to about 60° C. upon a suspension prepared from acenaphthindandion-diketimide and diluted hydrochloric acid until the starting material can no longer be detected in the reaction mixture.

4. The process which comprises causing chlorine to act at a temperature of about 40° C. upon an aqueous suspension of acenaphthindandion-diketimide until the starting material can no longer be detected in the reaction mixture.

5. The process which comprises causing bromine to act at a temperature of about 40° C. upon an aqueous suspension of acenaphthindandion-diketimide until the starting material can no longer be detected in the reaction mixture.

6. As new products, the compounds of the probable general formula:

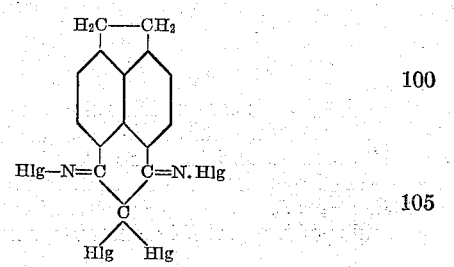

wherein Hlg represents a halogen atom of the group consisting of chlorine and bromine.

7. As a new product, the compound of the probable formula:

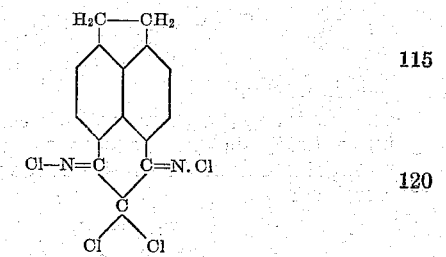

forming a yellowish-white product, splitting off chlorine on being warmed with a diluted acid.

8. As a new product, the compound of the probable formula:

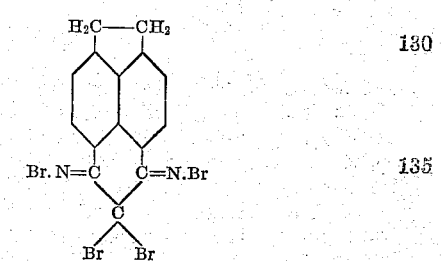

being a yellowish-white product.

WILHELM ECKERT.
HEINRICH SIEBER.